United States Patent [19]

Mizuno et al.

[11] 4,424,986
[45] Jan. 10, 1984

[54] IMPACT ENERGY ABSORBING STRUCTURE FOR F-F TYPE MOTOR VEHICLE

[75] Inventors: Kazutoshi Mizuno, Fujisawa; Shigeo Ono, Hamura, both of Japan

[73] Assignee: Nissan Motor Co., Ltd., Yokohama, Japan

[21] Appl. No.: 299,131

[22] Filed: Sep. 3, 1981

[30] Foreign Application Priority Data

Sep. 22, 1980 [JP] Japan ................. 55-132713

[51] Int. Cl.³ .............................................. B62D 21/00
[52] U.S. Cl. ...................................... 280/784; 52/573
[58] Field of Search .................. 280/784; 52/573, 731, 52/99

[56] References Cited

U.S. PATENT DOCUMENTS 3,794,348  2/1974  Fischer ................................. 280/784
3,827,712  8/1974  Suzuki et al. ........................ 280/784

FOREIGN PATENT DOCUMENTS 434027  6/1970  Australia ............................. 280/784
438235  1/1972  Australia ............................. 280/784

*Primary Examiner*—Richard A. Bertsch
*Attorney, Agent, or Firm*—Lane, Aitken & Kananen

[57] ABSTRACT

Side members which extend along each side of an engine compartment are designed and arranged so that they will buckle out sideways during a frontal collision to absorb initial impact energy. This prevents the engine from being pulled upwardly in the vehicle and allows same to be driven rearwardly to stagewisely crush structual panels to absorb further impact energy. The movement of the engine directly rearwardly also allows for the cross member/side sill chassis construction to receive and dissipate the energy not absorbed through panel deformation. Accordingly, the forward bulkhead is not directly deformed by the engine which would otherwise occur if the engine were forced upwardly by the impact.

8 Claims, 6 Drawing Figures

IMPACT ENERGY ABSORBING STRUCTURE FOR F-F TYPE MOTOR VEHICLE

BACKGROUND OF THE INVENTION

1. Field of the Invention

The present invention relates generally to F-F (front engine-front wheel drive) vehicles and more specifically to a structure therefor which absorbs the impact energy resulting from a frontal collision of the vehicle in such a manner as to minimize the degree by which the forward bulkhead is deformed.

2. Description of the Prior Art

In a known arrangement such as illustrated in FIGS. 1 and 2 of the drawings, a side member 1 has been disposed longitudinally along each side of an engine compartment 2. Each of the side members 1 has a box-section which gradually flares out as the side member extends from the front of the vehicle toward the rear thereof. The aft end of the side member is connected to both the dash panel, which forms part of the forward bulkhead 3, and the floor panel 4 of the vehicle cabin.

In this type of arrangement in order to allow for the provision of a laterally disposed engine, particularly wherein the engine is of the type where the transmission 7 is fixed to the engine proper at one end thereof, the side member 1 must be located at a relatively high position within the vehicle as compared with a conventional F-R (front engine-rear wheel drive) vehicle, to prevent mutual interference therebetween. This of course induces a rather large offset "L1" between the side member 1 and each corresponding extension member 8 which is fixed to the lower surface of the floor panel 4 inboard of the side sills 9 (shown in phantom). The extension members 8 (only one is shown) are of course preferably fixed to the lower surface of the floor panel 4 so as to not detract from the "leg room" of the cabin and are connected to a forward cross member 10 spanning between the two very rigid side sills 9.

In an effort to strengthen the connection between the side member 1 and the extension member 8 & forward bulkhead 3 and provide the desired amount of vehicle body rigidity, reinforcements 11 have been included in the structure in order to compensate for the large offset inherent therein.

However, this arrangement has suffered from a number of drawbacks which include production and assembly complexity. Viz., the many and various members constituting the side and reinforcement members 11, etc., must be very complexly shaped so as to minimize the waste when pressing and stamping the panels and provide the desired structural strength; which in turn renders the docking of the members together during assembly both difficult and time consuming.

Further, and more importantly, this arrangement has suffered in that during a frontal collision such as a "head on" collision or the like, the side member 1 instead of desirably buckling uniformly along its length (and thus absorbing the impact energy) and subsequently directing the impact shock through the very rigid extension member/floor panel/cross member/side sill construction, tends to (as shown in chain line) markedly buckle upwardly at the point of least structural strength (Viz., in the vicinity of Q1). This in combination with the rather large offset required in F-F vehicles produces a rather large moment of force which in turn markedly buckles the extension member/floor panel construction about a point Q2 in the direction indicated by the arrow. The result of the buckling of the vehicle structure about these two points subsequently tends to pull the engine 6 and transmission 7 upwardly within the engine compartment 2 allowing the unit to be driven against the relatively weak forward bulkhead 3 increasing the deformation of the vehicle cabin 5. This latter said deformation is of course highly undesirable as the limbs and body of the vehicle occupants are highly endangered by same.

SUMMARY OF THE INVENTION

The present invention features a structural arrangement wherein the side members which extend along either side of an engine compartment are so designed and arranged within the vehicle so that the section of least structural strength will buckle laterally outwardly upon a frontal collision so as to absorb the initial impact and prevent the engine and transmission from being pulled up within the engine compartment. Subsequently, if the collision is severe enough to produce further structural deformation, the engine and transmission are then forced directly rearwardly whereby the drive shafts (stub axles) firstly contact and deform panels such as those defining the suspension towers, whereafter the engine and transmission contact and deform the suspension supporting structure. This stagewisely absorbs the impact via stagewise deformation of various structural panels and simultaneously stepwisely increases the resistance to further deformation.

Further, as the engine and transmission are not pulled upwardly within the engine compartment to any particular degree, the impact energy not absorbed by panel deformation may be dissipated through the very rigid extension member/cross member/side sill construction defined along the lower side of the vehicle. The deformation of the forward bulkhead is accordingly remarkably reduced reducing the hazard within the vehicle cabin.

BRIEF DESCRIPTION OF THE DRAWINGS

The features and advantages of the present invention will become more clearly appreciated from the following description, taken in conjunction with the accompanying drawings in which.

DETAILED DESCRIPTION OF THE PREFERRED EMBODIMENTS

Figure 1:
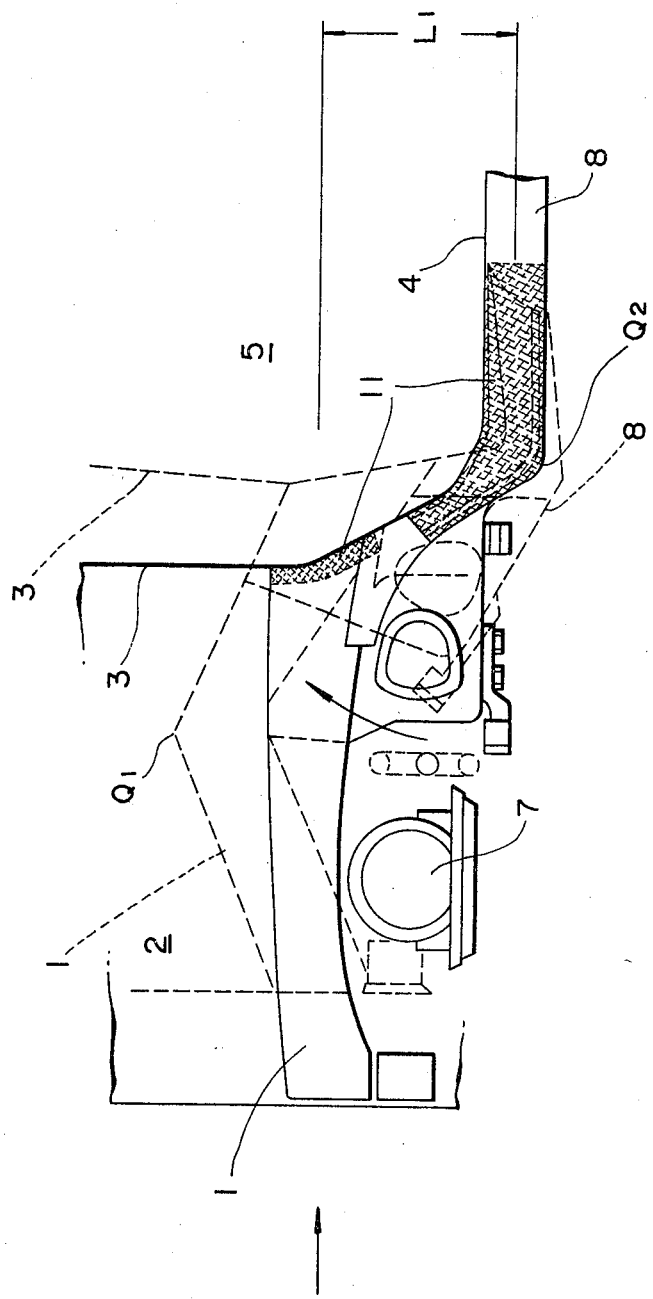
FIGS. 1 and 2 are schematic elevation and plan views respectively, of the front end of an F—F vehicle having a prior art body construction.
Figure 2:
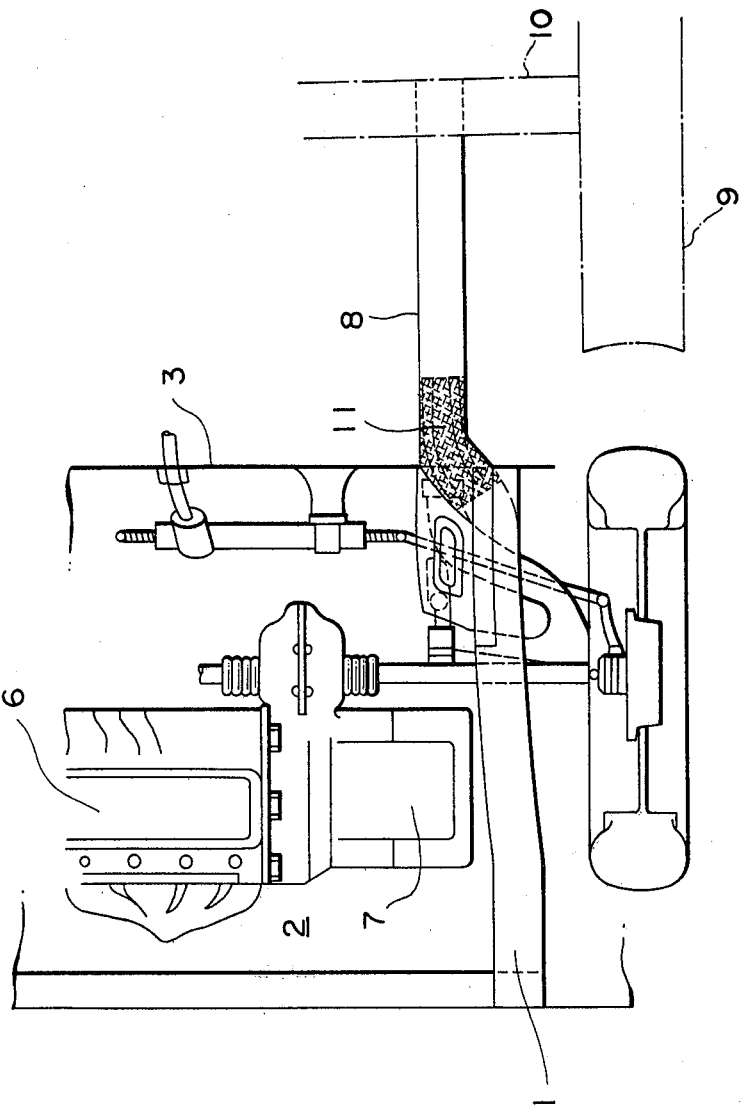
Figure 3:
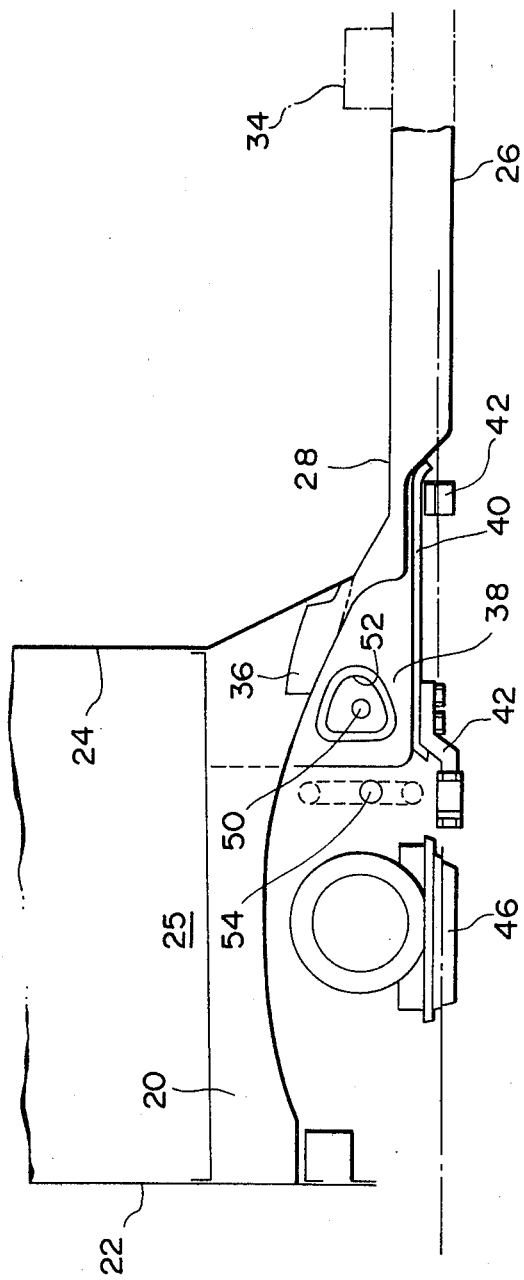
FIGS. 3 and 4 are respectively, schematic elevation and plan views of an F—F vehicle having a body construction according to a preferred embodiment of the present invention.
Figure 4:
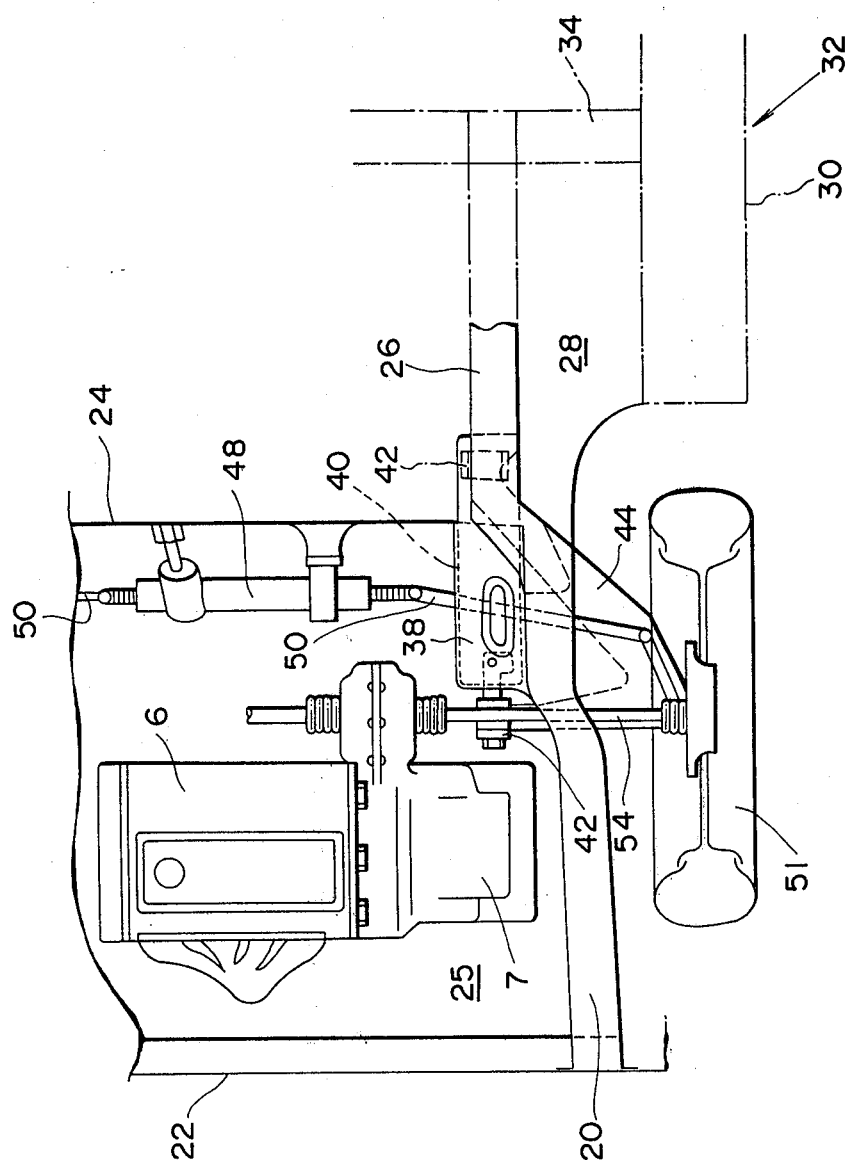

Turning now to the drawings and more particularly FIGS. 3 and 4, a preferred embodiment of the present invention is shown. In this arrangement, side members 20 (only one shown) extend from a radiator core support panel 22 to a forward bulkhead 24 along either side of an engine compartment 25. The aft portion of each side member 20 curves both downwardly and inwardly so as to connect not only with the forward bulkhead 24 but with an extension member 26 fixed to the bottom of the floor panel 28. The side members 20 and the extension members 26 have box sections which tend to flare out as the members approach and/or overlap each other.

As best seen in FIG. 4, the extension member 26 is fixed to the lower surface of the floor panel 24 so as to extend inboard of and essentially parallel with side sills 30 (shown in phantom) of the vehicle body 32. The ends of each extension member are fixed to a forward cross member 34 (also shown in phantom) which extends laterally across the upper surface of the floor panel to interconnect at the ends thereof with the two side sills 30.

As seen in FIG. 3 the side and extension members 20 & 26 overlap and are interconnected by spot welding. It should be noted however, that the illustrated flange 36 of the extension member which is spot welded to the side member 20 is actually on a surface which is curving both inwardly and downwardly and has been illustrated as shown only for the sake of clarity.

Interconnected with both the side member 20 and the extension member 26 as well as the forward bulkhead 24 is a structural member or members for housing the suspension strut (not shown). This structural member or suspension tower 38 extends a little further inboard than the extension member 26. Fixed to the bottom of the suspension tower is a base plate or gusset 40 on which mounting brackets 42 for suspension arms 44 are mounted.

As shown in FIG. 3 the sumps 46 of both the engine and the transmission are arranged to align with the axis about which the suspension arm 44 pivots; the extrapolation of which, as shown, lies below the offset "L1" defined between the centerlines of the side member 20 and the extension member. Thus, the vehicle structure is such that, as seen both in plan and elevation, the members constituting the structure of the present invention are arranged with both horizontal and vertical offsets and accordingly tend diagonally inward (as seen in front elevation of the vehicle).

A steering system 48 is connected to the forward bulkhead 24 and arranged so that links 50 extending to the front wheels 51 of the vehicle pass through apertures 52 formed in the suspension tower 38.

Figure 5:
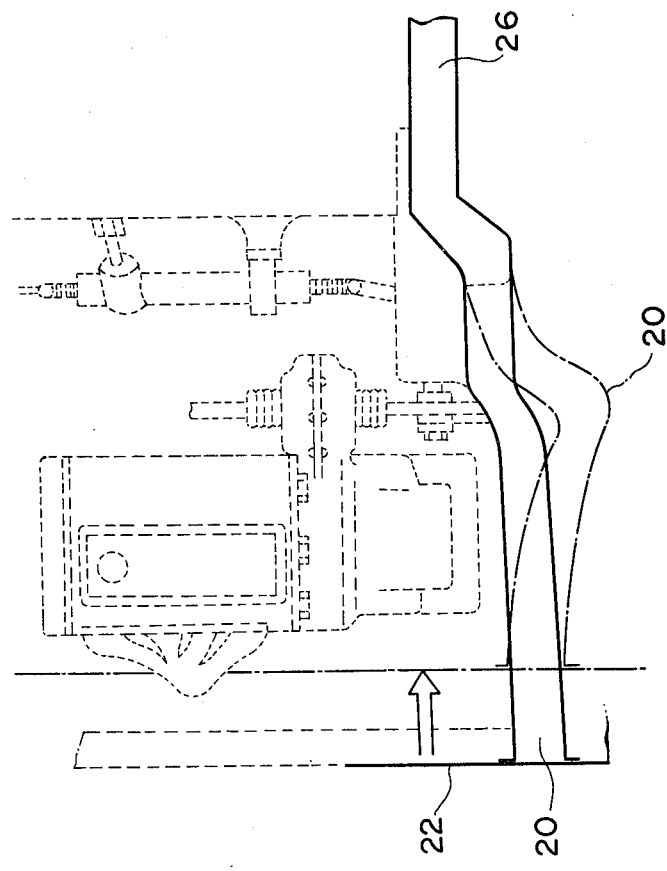
FIGS. 5 and 6 are views similar to 3 and 4, but which show the panel deformation and stagewise collision which characterizes the present invention.
Figure 6:
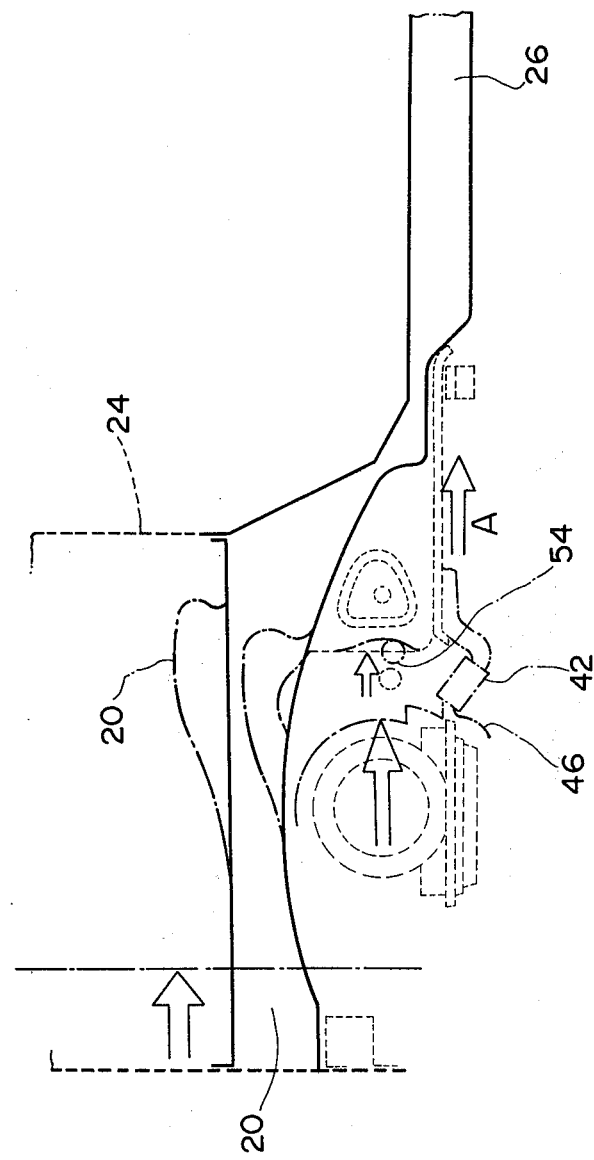

FIGS. 5 and 6 are views similar to FIGS. 3 and 4 but which show the probable deformation which will occur upon a frontal collision of the vehicle. In these drawings the essential elements such as the side member 20 and the extension member 26 are shown in solid line while the deformation of same and/or other elements and/or the positions of said elements which may be expected in a collision are shown in phantom.

As seen in FIG. 4 the side member 20 is buckled laterally outwardly during the initial stage of the collision and, if the collision produces a relatively weak impact, then no further deformation may be expected. However, in the case of a severe impact, the engine 6 and transmission 7 will be subsequently driven rearwardly as shown by the bold arrows to the positions indicated in phantom in FIG. 6. The first member of the engine and transmission to collide with a structural panel will be the drive shafts or stub axles 54 which will deform the panel or panels defining the suspension tower 38. Following this, the engine and transmission per se, may be expected to impact on the forward mounting bracket and/or forward edge of the suspension arms 44 deforming same. Thereafter, the steering links 50 may also strike and begin further deformation of the suspension tower panels although this is not illustrated in this figure.

Hence, with this arrangement the impact force will tend to act essentially in the direction shown by the bold arrow "A" below the base plate. Viz., through the extension member to the cross member and side sills for dissipation therein.

Thus, in summary, the present invention features a construction wherein, upon a frontal collision, side members will first buckle or deform laterally with respect to the vehicle and thereafter (in the case of a severe impact) the engine and transmission move rearwardly so that panels located behind the engine will be stagewisely crushed or deformed to absorb impact energy. Further energy not absorbed by the panel deformation will be dissipated through the rigid forward cross member/side sill construction of the vehicle chassis due to the engine not being pulled up to a position where it will impact on and deform a forward bulkhead which defines the front of the vehicle cabin.

A further feature of the present invention also comes in that in the undeformed state of the vehicle body the drive shafts 54 are arranged to extend over the top of the engine mounting brackets 42, so that, in the event that a drive shaft should become disconnected at one end thereof, it will be prevented from hazardously dropping into contact with the surface of the road.

What is claimed is:

1. In a vehicle having a body and an engine mounted in an engine compartment at the front thereof, which engine unit is adapted to drive the front wheels of the vehicle, a structure comprising:

a pair of side members which extend along the lateral sides of said engine compartment;

a pair of extension members each fixed to a side member, said extension members being fixed to the lower surface of a floor panel of a cabin of said vehicle and each located inboard of and lower than the respective side members to which it is connected, said extension members each being adapted to connect with a side member through a forward portion which curves upwardly and outwardly to mate with an aft portion of the side member which curves downwardly and inwardly with respect to the vehicle; and structural panels located aft of said engine unit; each of said side members being adapted to buckle laterally outward upon a frontal collision whereby said engine may be driven in the aft direction to stagewisely cause the deformation of said structural panels and so that impact energy may be dissipated through said extension members to other relatively rigid structural members defining the body of said vehicle.

2. A structure as claimed in claim 1, wherein each of said side members and said extension members have box sections and wherein each extension member overlaps a side member where the extension member curves upwardly and outwardly.

3. A structure as claimed in claim 1, further comprising a pair of suspension towers, each suspension tower being defined by one or more panels which are connected to at least one of a side member, an extension member and said forward bulkhead; and suspension arm mounting brackets fixed to the bottom of each suspension tower, said mounting brackets being located at a level to be struck and deformed by said engine unit upon said engine unit being driven rearwardly by a predetermined distance.

4. A structure as claimed in claim 3, further comprising a pair of base plates each fixed to the bottom of a suspension tower, said base plates serving to mount said suspension arm mounting brackets and reinforce the sites where said suspension arm mounting brackets are disposed.

5. A structure as defined in claim 3, wherein said suspension mounting brackets are arranged to be aligned with said extension members.

6. A structure as claimed in claim 3 wherein said engine unit includes a transmission mounted at one end of said engine and a final drive unit from which drive shafts extend to each of said front wheels, said drive shafts each being arranged to juxtapose a suspension tower so that upon said engine unit being driven rearwardly by a second predetermined distance which is shorter than the first said predetermined distance, said drive shafts contact and deform said suspension towers to absorb impact energy.

7. A structure as claimed in claim 6, wherein each of said drive shafts is arranged to normally extend over the top of a mounting bracket.

8. An impact absorbing structure for a front engine front wheel drive vehicle comprising:
- a vehicle cabin having a floor panel, side sills which extend along the lateral sides of said cabin and a cross member which extends laterally across said floor panel and which interconnects said side sills;
- an engine compartment which is separated from said cabin by a bulkhead and in which an engine and transmission unit is disposed;
- a pair of side members which extend along the lateral sides of said engine compartment at a predetermined level above the level of said floor panel, said predetermined level being selected to provide space beneath said side members to permit a drive connection between said engine and transmission unit and a pair of forward wheels of said vehicle;
- a pair of extension members which are connected at the aft ends thereof to said cross member and which curve upwardly and outwardly to connection at the forward ends thereof with the aft ends of a respective side member;
- a pair of suspension mounting structures for each supporting one of said forward wheels, said suspension mounting structures being secured in part to said extension members;
- said engine and transmission unit being disposed in said engine compartment so that the lower aft portions thereof are aligned with portions of said side members and said suspension mounting structures;
- said side members being adapted to buckle laterally outward upon a frontal collision whereby said engine and transmission unit may be driven in the aft direction without being lifted within said engine compartment to stagewisely cause, without excessive deformation the deformation of said suspension mounting structures so that the impact energy may be dissipated through said extension members to said cross member and said side sills.

* * * * *